United States Patent
Goote et al.

(10) Patent No.: US 11,289,088 B2
(45) Date of Patent: *Mar. 29, 2022

(54) VEHICLE-BASED REMOTE CONTROL SYSTEM AND METHOD

(71) Applicant: Gentex Corporation, Zeeland, MI (US)

(72) Inventors: Nicholas J. Goote, Hudsonville, MI (US); Steven L. Geerlings, Holland, MI (US); Thomas S. Wright, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/778,552

(22) Filed: Jan. 31, 2020

(65) Prior Publication Data

US 2020/0168224 A1 May 28, 2020

Related U.S. Application Data

(63) Continuation of application No. 15/724,631, filed on Oct. 4, 2017, now Pat. No. 10,553,212.

(Continued)

(51) Int. Cl.
*G10L 15/22* (2006.01)
*B60R 16/023* (2006.01)
*G10L 15/30* (2013.01)

(52) U.S. Cl.
CPC .......... *G10L 15/22* (2013.01); *B60R 16/023* (2013.01); *G10L 15/30* (2013.01); *G10L 2015/223* (2013.01)

(58) Field of Classification Search
CPC ..................................................... G10L 15/22
See application file for complete search history.

(56) References Cited

U.S. PATENT DOCUMENTS

| 5,450,525 | A | 9/1995 | Russell et al. |
| 6,496,107 | B1 | 12/2002 | Himmelstein |

(Continued)

FOREIGN PATENT DOCUMENTS

| CN | 105620388 A | 6/2016 |
| CN | 205541480 U | 8/2016 |
| WO | 2016119064 A1 | 8/2016 |

OTHER PUBLICATIONS

Adam Dachis, "The Seven Best Things You Can Do With an Amazon Echo," [online], published on Mar. 30, 2016, https://lifehacker.com (Year: 2016).

(Continued)

*Primary Examiner* — Jialong He
(74) *Attorney, Agent, or Firm* — Price Heneveld LLP; Brian James Brewer

(57) ABSTRACT

A remote control system of a vehicle is configured to control a remote device via a first electronic device. The first electronic device is configured to control the transmission of a semi-generic user voice command and the voice command is updated based on one or more spoken words generating an updated voice command. The remote control system comprises a second electronic device in communication with the first electronic device. A controller is configured to prompt the first electronic device to cause the updated voice command to be accessed and transmitted to a remote device controller located remotely from the vehicle in response to the input from a user-input mechanism of the second electronic device. The remote device controller processes the updated voice command, generates a control command based on the updated voice command, and executes the control command.

20 Claims, 4 Drawing Sheets

Related U.S. Application Data

(60) Provisional application No. 62/404,374, filed on Oct. 5, 2016.

(56) References Cited

U.S. PATENT DOCUMENTS

| | | | |
|---|---|---|---|
| 7,194,412 B2* | 3/2007 | Mays | G10L 15/26 |
| | | | 340/5.71 |
| 7,363,029 B2 | 4/2008 | Othmer | |
| 7,826,945 B2 | 11/2010 | Zhang et al. | |
| 9,393,361 B2 | 7/2016 | Stiles | |
| 2003/0182132 A1* | 9/2003 | Niemoeller | G10L 15/22 |
| | | | 704/275 |
| 2007/0167138 A1* | 7/2007 | Bauman | H04L 12/2803 |
| | | | 455/41.2 |
| 2008/0071546 A1 | 3/2008 | Beiermeister et al. | |
| 2008/0147410 A1 | 6/2008 | Odinak | |
| 2008/0215240 A1 | 9/2008 | Howard et al. | |
| 2010/0029387 A1* | 2/2010 | Luisi | A63F 13/10 |
| | | | 463/35 |
| 2010/0049515 A1 | 2/2010 | Sumiyoshi et al. | |
| 2010/0240307 A1 | 9/2010 | Sims et al. | |
| 2011/0151852 A1 | 6/2011 | Olincy et al. | |
| 2011/0193680 A1* | 8/2011 | Summerford | G08C 17/02 |
| | | | 340/5.51 |
| 2011/0263228 A1 | 10/2011 | Selby | |
| 2012/0035923 A1 | 2/2012 | Krause | |
| 2012/0245945 A1 | 9/2012 | Miyauchi et al. | |
| 2013/0185072 A1 | 7/2013 | Huang et al. | |
| 2013/0191122 A1 | 7/2013 | Mason | |
| 2014/0200898 A1 | 7/2014 | Wischhof et al. | |
| 2014/0300457 A1 | 10/2014 | Geerlings | |
| 2014/0365068 A1 | 12/2014 | Burns et al. | |

OTHER PUBLICATIONS

JR Raphael, "OK, Google: 160 Valuable Voice Commands for Android," [online], published on Jul. 13, 2016, http://www.computerworld.com (Year: 2016).

* cited by examiner

VEHICLE-BASED REMOTE CONTROL SYSTEM AND METHOD

CROSS-REFERENCE TO RELATED APPLICATION

This application is a continuation of U.S. patent application Ser. No. 15/724,631 filed Oct. 4, 2017, entitled "VEHICLE-BASED REMOTE CONTROL SYSTEM AND METHOD," now U.S. Pat. No. 10,553,212, which claims priority to U.S. Provisional Application No. 62/404,374 filed Oct. 5, 2016, entitled "VEHICLE-BASED REMOTE CONTROL SYSTEM," the entire disclosures of which are hereby incorporated by reference herein.

BACKGROUND OF THE INVENTION

The present invention generally relates to a remote control system of a vehicle, and more particularly, to a vehicle-based remote control system for controlling one or more smart devices located remotely from the vehicle.

SUMMARY OF THE INVENTION

According to one aspect of the present invention, a remote control system of a vehicle is disclosed. The system is configured to control a remote device via a first electronic device. The first electronic device is configured to control the transmission of a semi-generic user voice command in an application. The semi-generic voice command is updated based on one or more spoken words thereby generating an updated voice command. The remote control system comprises a second electronic device in communication with the first electronic device and disposed in the vehicle. The second electronic device comprises a user-input mechanism comprising at least one actuatable member configured to receive an input. A controller is configured to prompt the first electronic device to cause the updated voice command to be accessed and transmitted to a remote device controller located remotely from the vehicle in response to the input from the user-input mechanism. The remote device controller processes the updated voice command, generates a control command based on the updated voice command, and executes the control command for an action specified by the updated voice command.

According to another embodiment of the present invention, a remote control system in communication with a first electronic device is disclosed. The remote control system comprises a remote device controller remotely located from the first electronic device. The remote device controller is configured to receive an updated voice command via a communication initiated from the first electronic device. The first electronic device is in communication with a second electronic device disposed in a vehicle. The updated voice command comprises a semi-generic voice command updated based on one or more spoken words. The first electronic device is configured to receive a prompt from a second electronic device, wherein the prompt is one of a plurality of programmable instructions communicated from a controller of the second electronic device in response to an input received by a user input mechanism of the second electronic device. In response to receiving the prompt from the first electronic device, the first electronic device is configured to cause the updated voice command to be accessed and transmitted to the remote device controller located remotely from the vehicle. In response to receiving the updated voice command, the remote device controller processes the updated voice command, generates a control command based on the updated user voice command, and executes the control command for an action specified by the updated user voice command.

According to yet another embodiment of the present invention, a method for operating a remote control system for a vehicle is disclosed. The method comprises recording one or more spoken words thereby generating a pre-recorded user voice command. The one or more spoken words of the pre-recorded user voice command identify a device controlled by the remote control system. The method further comprises generating an update voice command by combining the pre-recorded voice command with a semi-generic voice command. The semi-generic voice command is updated based on the one or more spoken words thereby generating an updated voice command configured to control the device. The method further comprises controlling a mobile electronic device to initiate a communication of the updated voice command to a remote device controller of the remote control system. The mobile electronic device is controlled to initiate the communication of the updated voice command in response to a prompt from a vehicle accessory disposed in the vehicle. The prompt is one of a plurality of programmable instructions communicated from a controller of the vehicle accessory in response to an input received by a user input mechanism of the vehicle accessory. In response to receiving updated voice command, the method further comprises generating, with the remote device controller, a device specific command configured to control an operation of the device based on the semi-generic voice command and the pre-recorded user voice command.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

Figure 1:
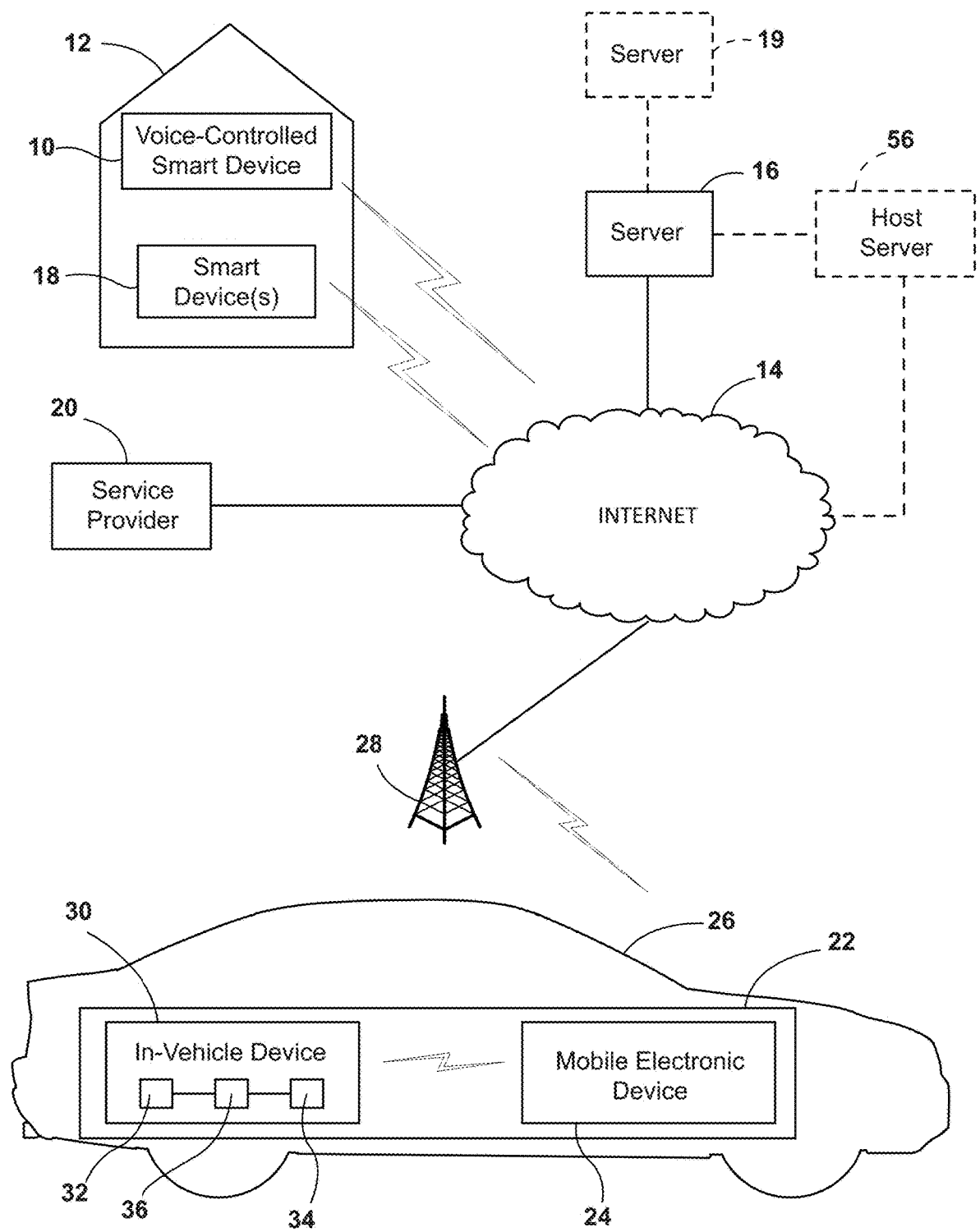
FIG. 1 is a block diagram showing a vehicle-based control system in communication with a server responsive to voice commands according to embodiments of the present invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The terms "including," "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

FIG. 1 shows a voice-controlled smart device 10 located inside a home 12. For purposes of illustration and better understanding, device 10 may be an Echo or Echo Dot sold by Amazon. As is known, the Echo or Echo Dot includes a built-in microphone and speaker, and is a hands-free, voice controlled device that uses a virtual assistant called Alexa. In operation, the device 10 continuously listens for a wake word (e.g., "Alexa") to be spoken by a user. Once the user says the wake word, device 10 recognizes that the wake word has been said and begins recording a user voice command. Once the user has finished speaking, device 10 sends the recording over the internet 14 to a server 16, such as Alexa Voice Services (AVS), which is a cloud service operated by Amazon. Server 16 processes the recording and generates a command sent over the internet 14 to device 10. Device 10 receives the command and implements a task consistent with the user voice command originally spoken by the user. For example, if the user said "Alexa, what is the weather today?", Alexa may respond with a general forecast related to the geographical area of the user.

In other instances, device 10 may be linked to one or more compatible smart devices 18 such as any of those produced by Samsung SmartThings, Wink, Insteon, Nest, Phillips Hue, Wemo, Ecobee, for example. Once devices 18 are linked to device 10, server 16 is able to generate commands for controlling one or more of the devices 18 in response to a complimentary user voice command recording(s). For example, when server 16 receives a user voice command related to the control of a linked device, such as one of devices 18, the server 16 may parse the user voice command before sending it to another server 19 in charge of the linked device. That server 19 would in turn generate a command in accordance with the user voice command. Alternatively, it is contemplated that server 16 may generate a command for directly controlling the linked device, if such functionality permits.

Accordingly, devices such as Echo and Echo Dot may enable a user to not only request information on demand, but also automate various home features in response to a user voice command. Such features may include lights, thermostats, speakers, sprinklers, fans, and televisions, for example. In addition, device 10 may be configured such that a user voice command results in server 16 generating a command that is transmitted over the internet 14 to a web-based service provider 20 for prompting the same to render a service. For example, current installments of the Echo and Echo Dot enable a user to order pizza from Domino's pizza or a shuttle vehicle from Uber.

At present, the interface to AVS has been made public, thereby enabling third parties to develop devices and/or services compatible with Echo or Echo Dot. Accordingly, the versatility of devices such as Echo or Echo Dot will likely increase as time goes on due to an increase in the number of third parties developing compatible uses for their products and/or services. While device 10 has been described herein as being an Echo or Echo dot, it is to be understood that device 10 is not necessarily limited to the same. For example, Google, Apple, and Microsoft also offer services capable of performing tasks based on user voice commands. Such services use a similar approach to Amazon in that user voice commands are processed in a cloud service. Accordingly, it is conceivable that device 10 may be based off of OK google, Siri, and Cortana, as offered by Google, Apple, and Microsoft, respectively, without materially departing from the teachings provided herein.

While devices like Echo and Echo Dot have proven to be quite capable in the realm of home automation, they suffer from several drawbacks. Notably, the Echo and Echo Dot require internet connectivity and are limited to a hearing range, typically requiring a user to be in the same room in order for the device to hear the wake word. Furthermore, in loud environments, it may be difficult to differentiate a user voice command from ambient noise. As such, the user may be required to repeat the user voice command multiple times. Thus, usage of these devices may be generally restricted to a relatively quiet home or office setting. Accordingly, there is a need for a means to control these devices and/or devices linked thereto when the user is on the move and not in hearing range, such as when driving a vehicle.

Figure 2:
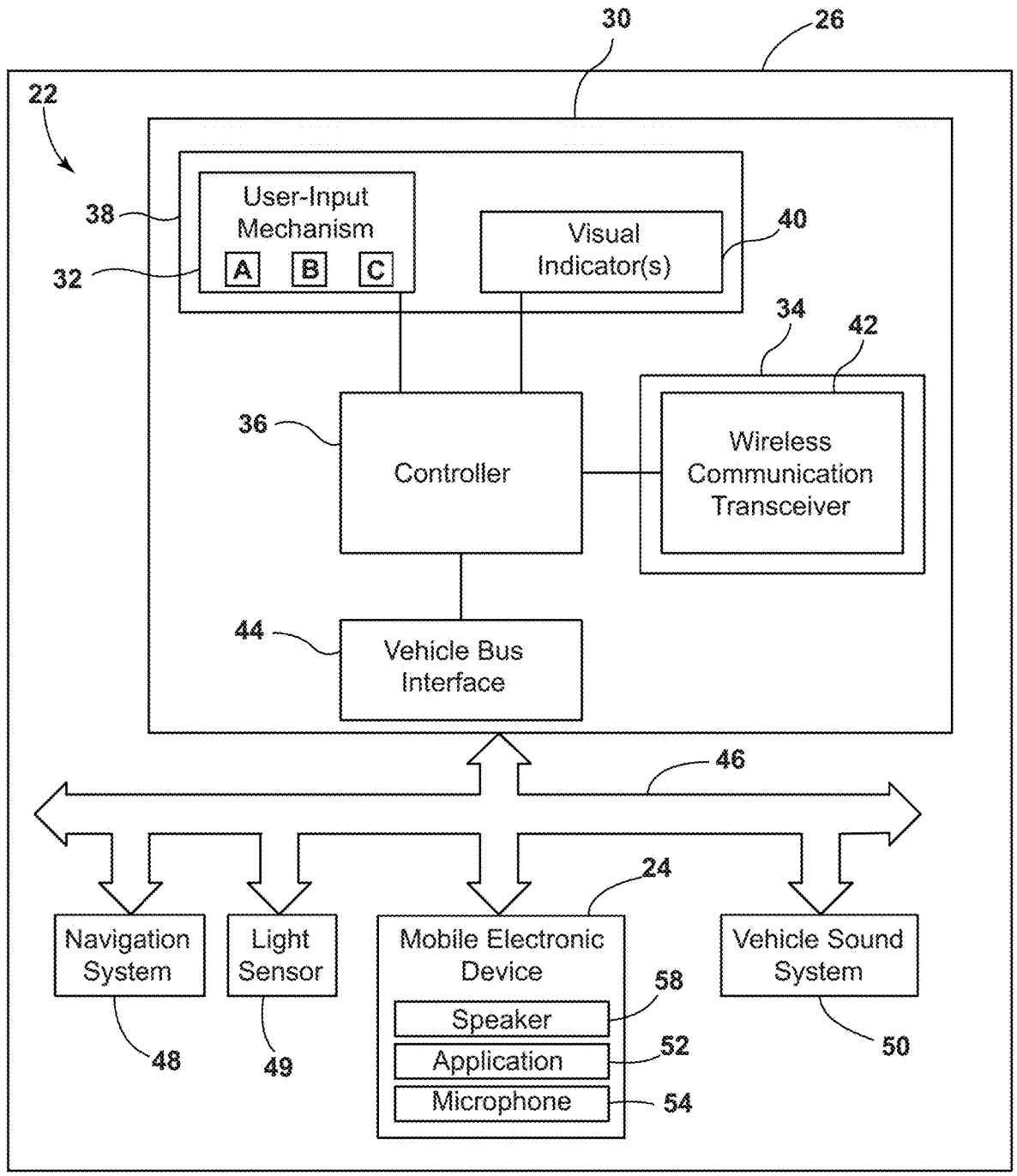
FIG. 2 is a block diagram showing the vehicle-based control system in greater detail.

With reference to FIGS. 1 and 2, a vehicle-based remote control system 22 is shown according to embodiments of the present invention. As described herein, the remote control system 22 communicates with server 16 and enables a user, typically a vehicle occupant (e.g. the driver), to remotely control device 10 and/or devices 18 linked thereto without having to issue a user voice command. The remote control system 22 may include a first in-vehicle device, shown as a mobile electronic device 24, generally located inside a vehicle 26. In alternative embodiments, the first in-vehicle device may be integrated within vehicle equipment such as, for example, a center control console, an overhead console, and the like. The mobile electronic device 24 connects to the internet 14 through a cellular telephone tower 28 or through other known means such as Wi-Fi. The mobile electronic device 24 may be a smartphone, tablet, or the like, or may alternatively be a dedicated device integrated with the vehicle or portable in nature. The remote control system 22 may also include a second in-vehicle device, shown as in-vehicle device 30, in communication with the mobile electronic device 24. In-vehicle device 30 may be integrated within the vehicle 26 and may receive power from the vehicle battery and/or vehicle ignition. According to one embodiment, in-vehicle device 30 may be one of several HOMELINK® devices available from Gentex Corporation of Zeeland, Mich. Such devices may, for example, be integrated with a rearview mirror assembly, a sun visor, or a vehicle console such as an overhead console.

In-vehicle device 30 includes a user-input mechanism 32, an interface 34 configured to communicate with the mobile electronic device 24, and a controller 36 coupled to the user-input mechanism 32 and the interface 34. The user-input mechanism 32 may include one or more actuatable members, exemplarily shown as buttons A, B, and C. While three buttons are shown, it is to be understood that more or less buttons may be provided, if desired. Alternatively, the actuatable members may be embodied as toggle switches, capacitive sensors, optical sensors, or any other component capable of registering user actuation. The user-input mechanism 32 may be associated with a user interface 38 that also includes one or more visual indicators 40 for providing feedback in response to actuation of the user-input mechanism 32.

The interface 34 may include a wireless communication transceiver 42 for enabling the controller 36 to wirelessly communicate with the mobile electronic device 24. For example, the wireless communication transceiver 42 may be configured such that communication between the controller 36 and the mobile electronic device 24 occurs via Bluetooth®, Bluetooth® Low Energy, Wi-Fi, or any other known wireless communication protocol. Additionally or alternatively, the interface 34 may include a vehicle bus interface 44 connected to a vehicle bus 46 for enabling the controller 36 to communicate with the mobile electronic device 24 via a USB connection or other known wired connection. The vehicle bus 46 may also connect to various vehicle equipment including, for example, a vehicle navigation system 48, a light sensor 49, and a vehicle sound system 50.

With respect to the embodiments described herein, the controller 36 may be a microprocessor programmed to transmit and receive, via interface 34, electronic communications to and from the mobile electronic device 24 in response to actuation of the user-input mechanism 32. Upon actuation of the user-input mechanism 32 (e.g., the user pressing buttons A, B, C, or a combination thereof), the controller 36 prompts the mobile electronic device 24 to transmit an electronic communication over the internet 14 to server 16 for processing. Based on the electronic communication, the server 16 generates a command that is transmitted over the internet 14 for executing an action specified by the electronic communication.

The electronic communication includes a pre-recorded user voice command that is stored on the mobile electronic device 24 and is assigned to one or more buttons A, B, C using an application 52 stored on the mobile electronic device 24. Application 52 exchanges communication with both in-vehicle device 30 and server 16, and enables the user to assign a pre-recorded user voice command to each of the buttons A, B, C of the user-input mechanism 32. Additionally, a pre-recorded user voice command may be assigned to two or more buttons A, B, C pressed simultaneously and/or a single button A, B, C pressed multiple times within a period of time, thereby increasing the number of unique assignments that can be made.

It is conceived that a given pre-recorded user voice command may be an actual voice command spoken by the user and recorded using a microphone 54 of the mobile electronic device 24, a generic voice command recording included in application 52, or a semi-generic voice command recording included in application 52. Using the Echo or Echo Dot for purposes of understanding, a setup process is described below in which the user desires to assign a pre-recorded user voice command for turning on the front lights of the user's home 12 to one of the buttons A, B, C. With respect to the following implementations of the setup process, the front lights may correspond to one of the smart devices 18 linked to smart device 10 and may be controlled directly by server 16 or may be controlled by device 10 or server 19 through instruction from server 16.

According to a first implementation, the user supplies a pre-recorded user voice command by simply speaking and recording, through the microphone 54, the following user voice command: "Alexa, turn ON the front lights". In such a scenario, the user need only assign the pre-recorded user voice command to one of the buttons A, B, C in order to complete the setup process. The assigned pre-recorded user voice command is stored on the mobile electronic device 24 such that any subsequent actuation of the assigned button A, B, C will result in the pre-recorded user voice command being transmitted from the mobile electronic device 24 to server 16 for processing. In turn, server 16 transmits a command to the corresponding device 18 for turning ON the front lights. Alternatively, the command may be transmitted to device 10 for accomplishing the same.

In a second implementation, the pre-recorded user voice command is supplied by application 52 and includes the following generic voice command recording: "Alexa, turn ON device one". In such a scenario, the setup process is completed once the user assigns the generic audio file to one of the buttons A, B, C, and also assigns "device one" as being the front lights, which may be managed using application 52. The assigned generic voice command recording is stored on the mobile electronic device 24 such that any subsequent actuation of the assigned button A, B, C will result in the generic voice command recording being transmitted from the mobile electronic device 24 to server 16 for processing under the directive that "device one" corresponds to the front lights. In turn, the server 16 transmits a command to the corresponding device 18 for turning ON the front lights. Alternatively, the command may be transmitted to device 10 for accomplishing the same.

In a third implementation, the pre-recorded user voice command is supplied by application 52 and includes the following semi-generic voice command recording: "Alexa, turn ON _____," where the user is required to fill out the blank by speaking and recording "the front lights", after which, application 52 updates the semi-generic voice command recording to include the user-supplied recording, which may include one or more spoken words. The user may then assign the updated semi-generic voice command recording to one of the buttons A, B, C, thereby completing the setup process. The assigned updated semi-generic voice command recording is stored on the mobile electronic device 24 such that any subsequent actuation of the assigned button A, B, C will result in the updated semi-generic voice command recording being transmitted from the mobile electronic device 24 to server 16 for processing. In turn, the server 16 transmits a command over the internet 14 to the corresponding device 18 for turning ON the front lights. Alternatively, the command may be transmitted to device 10 for accomplishing the same.

While the first, second, and third implementations described above contemplate storing the pre-recorded user voice command on the mobile electronic device 24, it is also contemplated that the pre-recorded user voice command may alternatively be transmitted from the mobile electronic device 24 over the internet 14 and stored on a host server 56 once assigned to one of the buttons A, B, C. In this manner, when the assigned button A, B, C is actuated, the controller 36 would instead prompt the mobile electronic device 24 to transmit an electronic communication in the form of a simple instruction over the internet 14 to the host server 56 prompting the same to transmit the pre-recorded voice command to server 16 for processing. Server 16 would then transmit a command for controlling device 18 in order to turn ON the front lights in a similar fashion to that described above with respect to the first, second, and third implementations. By using the mobile electronic device 24 to transmit an instruction instead of a pre-recorded user voice command, the user may benefit from a savings in data and bandwidth usage as the size of a pre-recorded user voice command is typically larger than the corresponding instruction. Host server 56 may be a cloud service that manages the API (application program interface) connection to server 16 and/or any other servers associated with device 10 and/or device(s) 18 linked thereto. While host server 56 is shown as being separate from server 16, it is conceived herein that host server 56 and server 16 may be otherwise integrated in some embodiments.

With respect to any of the embodiments described herein, it is contemplated that the controller 36 may be programmed to automatically prompt the mobile electronic device 24 to transmit an instruction or a pre-recorded user voice command in response to input provided by vehicle equipment, for example. According to one embodiment, the controller 36 may respond to input provided over the vehicle bus 46 from the vehicle navigation system 48 and the light sensor 49 to automatically prompt the mobile electronic device 24 to transmit an assigned pre-recorded user voice command to server 16. The assigned pre-recorded user voice command transmitted to server 16 may be for turning ON the front lights in instances where the input indicates that the vehicle 26 is approaching the user's home 12 at nighttime. This is but one example of how automatic communication between remote control system 22 and server 16 may be implemented. However, those skilled in the art will surely recognize other implementations in view of the teachings provided herein.

Regardless of where the pre-recorded user voice command is stored, the result is generally the same. Thus, whenever an assigned button A, B, C is actuated or in instances where the remote control system 22 automatically communicates with server 16 and/or host server 56, the corresponding pre-recorded voice command is ultimately transmitted to server 16, where it's processed and converted to a command such as turning ON the front lights. It is to be understood that various pre-recorded user voice commands may be assigned to the buttons A, B, C, and depending on the contents of the pre-recorded user voice commands, the corresponding command generated by server 16 may be for controlling device 10, one or more device(s) 18 linked to device 10, or a combination thereof. Thus, it is to be understood that a given pre-recorded user voice command may be related to the control of a single smart device or a number of smart devices. It is contemplated that number and/or types of smart devices associated with a given pre-recorded user voice command may be managed using application 52. Alternatively, the commands may be for requesting a service from service provider 20 or information from device 10 and any device(s) 18 linked thereto.

Auditory feedback in response to an executed command may be transmitted over the internet 14 to the mobile electronic device 24 and may be played through a speaker 58 of the mobile electronic device 24. Alternatively, the mobile electronic device 24 may transmit the feedback to the controller 36 via interface 34 such that the feedback may be played over the vehicle sound system 50. In one embodiment, application 52 may parse or convert the auditory feedback into visual feedback prior to transmitting it to the controller 36. As a result, the feedback may be expressed to the user via visual effects generated by the visual indicator(s) 40. With respect to the embodiments herein, feedback may correspond to a status, a requested information, or other information, and may be transmitted over the internet 14 (e.g., from device 10, device(s) 18, or service provider 20) to the mobile electronic device 24 via server 16 or host server 56.

Figure 3:
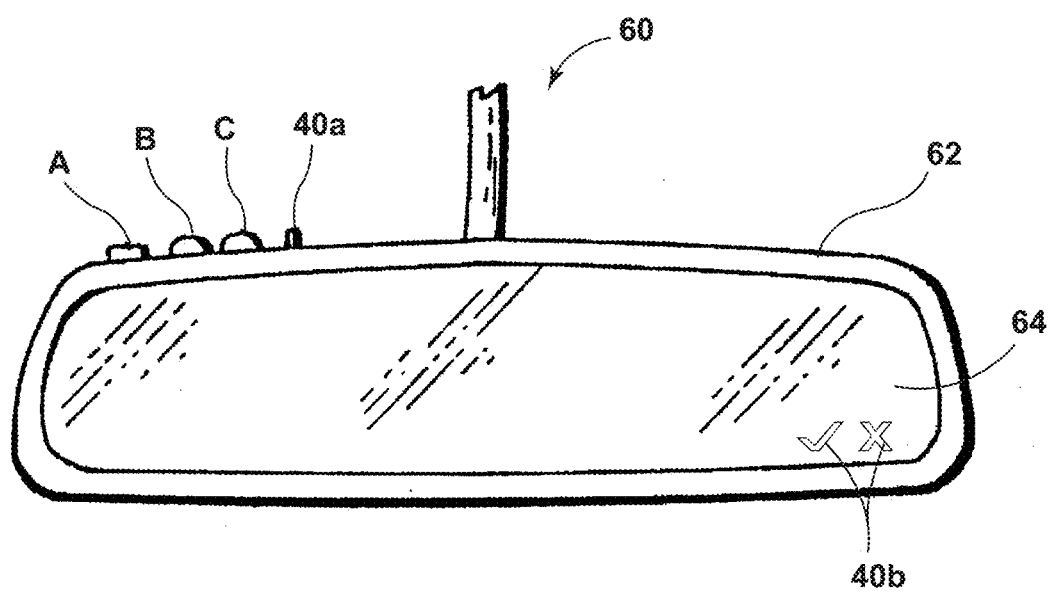
FIG. 3 is a front perspective view of a rearview mirror assembly incorporating an in-vehicle device of the vehicle-based control system.

FIG. 3 shows an example of a vehicle accessory in the form of a rearview mirror assembly 60 in which the in-vehicle device 30 may be incorporated. Although shown in the rearview mirror assembly 60, it is to be understood that the in-vehicle device 30 could be incorporated into various other vehicle accessories or locations within the vehicle 26. As shown in FIG. 3, the rearview mirror assembly 60 may include a housing 62 for mounting to the vehicle 26, and a rearview device 64 such as a rearview mirror element, a rearview display, or combination thereof. For purposes of illustration, buttons A, B, and C of the user-input mechanism 32 are exemplarily located proximate a top corner portion of the housing 62 along with visual indicator 40a. In alternative embodiments, buttons A, B, and C may be elsewhere located, such as, for example, on a front fascia of the rearview mirror assembly 60. In yet other alternative embodiments, buttons A, B, and C may be provided in vehicle equipment such as, but not limited to, a center console, an overhead console, and the like. Visual indicator 40a is operated to provide visual feedback in response to an executed command and may take the form of an LED indicator light capable of illuminating in one or more colors. In operation the visual indicator 40a may illuminate in green to indicate that an executed command was successful or red to indicate that the executed command failed, among other things.

Additionally or alternatively, a visual indicator 40b may be located on, in, or behind the rearview device 64 and include an illuminable icon or symbol such as a checkmark and an X. In other embodiments, the visual indicator 40b may include a display integrated in the rearview mirror assembly 60 and configured to generate a graphical icon or image. The checkmark and X work in conjunction to provide visual feedback in response to an executed command and may be exemplarily located proximate a bottom corner portion of the rearview device 64. In operation, the checkmark may be illuminated in green to indicate that an executed command was successful and the X may be illuminated in red to indicate that the executed command failed, among other things. The checkmark, X, or any other illuminable symbols or icons may be located behind a transflective element so as to be hidden from view until activated as disclosed in U.S. Pat. No. 8,643,481 filed Oct. 5, 2010, entitled "Interior rearview mirror assembly with integrated indicator symbol," the entire disclosure of which is incorporated herein by reference. The remaining components of the in-vehicle device 30 may be housed within housing 62 and are not shown in FIG. 3 for the sake of clarity.

With respect to embodiments where the rearview device 64 is an electro-optic mirror element, the controller 36 may be configured to read outputs of light sensors (e.g. light sensor 49) and control the reflectivity of the electro-optic mirror element. Further, the controller 36 may be programmed to control any other components within the rearview mirror assembly 60 such as a display, map lights, a compass, an imager, and/or a headlamp control system. The controller 36 may further be programmed to control other vehicle accessories via vehicle bus 46.

Figure 4:
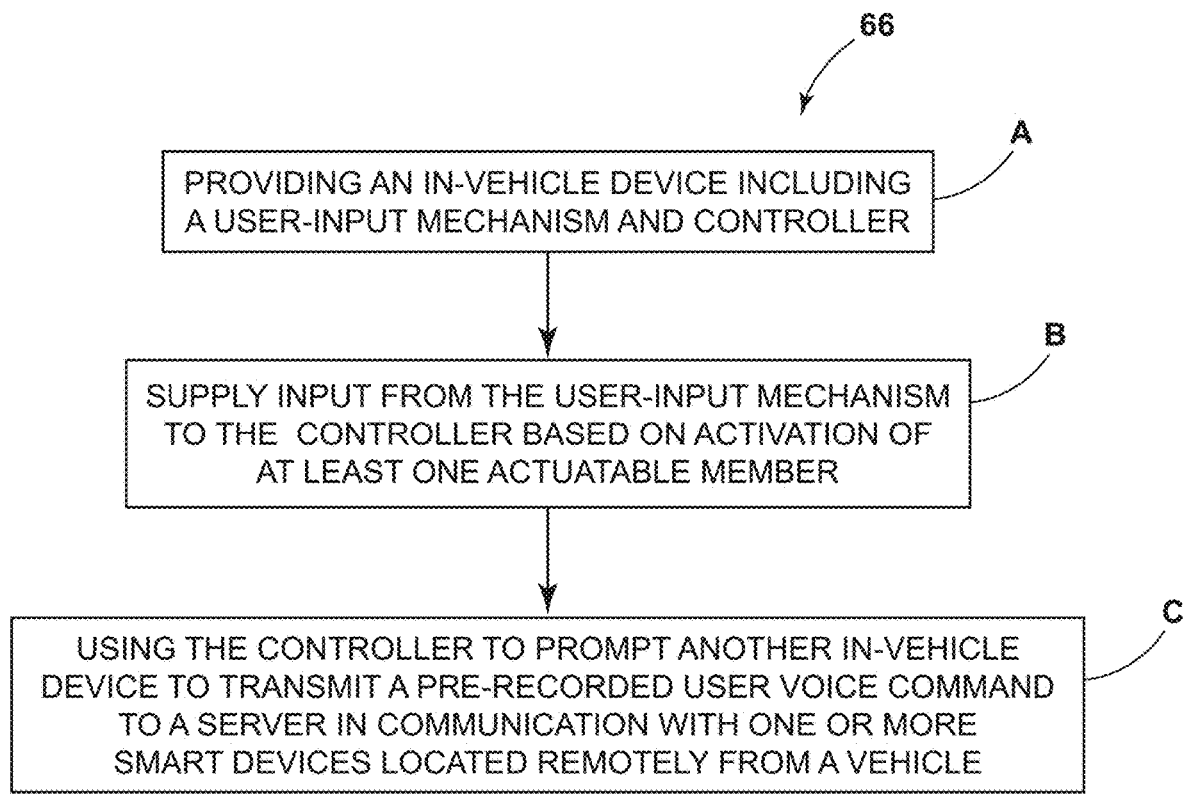
FIG. 4 is a flow diagram of a vehicle-based remote control method implemented using a user-input mechanism and a controller of the in-vehicle device.

Referring to FIG. 4, a vehicle-based remote control method 66 is shown and is described herein as being implemented by the controller 36 in response to input received from the user-input mechanism 32. As described herein, the user-input mechanism 32 includes at least one actuatable member (e.g., buttons A, B, and/or C) having a pre-recorded user voice command assigned thereto. The pre-recorded user voice command may be assigned to the at least one actuatable member using application 52 stored on mobile electronic device 24. For example, the pre-recorded user voice command may be an actual voice command spoken by a user and recorded using the microphone 54 of the mobile electronic device 24, a generic voice command recording included in application 52, or a semi-generic voice command recording included in application 52.

The method 66 may be a subroutine executed by any processor, and thus the method 66 may be embodied in a non-transitory computer readable medium having stored thereon software instructions that, when executed by a processor, cause the processor to execute the steps of the method 66 described below. In other words, aspects of the method 66 may be achieved by software stored on a non-transitory computer readable medium or software modifications or updates to existing software residing in a non-transitory computer readable medium.

As shown in FIG. 4, an in-vehicle device is provided at step A. The in-vehicle device includes the user-input mechanism 32 and the controller 36. The user-input mechanism 32 includes at least one actuatable member having a pre-recorded user voice command assigned thereto. At step B, input is supplied from the user-input mechanism 32 to the controller 36 based on activation of the at least one actuatable member. At step C, the controller 36 prompts another in-vehicle device (e.g., mobile electronic device 24) to transmit the pre-recorded user voice command to a server in communication with one or more smart devices located remotely from a vehicle. For example, the pre-recorded user voice command may be transmitted to server 16, which generates a command for executing an action specified by the pre-recorded user voice command. In turn, the command is transmitted to the one or more smart devices and is executed thereby.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It will be understood that any described processes, or steps within described processes, may be combined with other disclosed processes or steps to produce systems and methods within the scope of the present disclosure. The exemplary system and method disclosed herein are for illustrative purposes and are not to be construed as limiting.

It is also to be understood that variations and modifications can be made on the aforementioned system and method without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A remote control system of a vehicle, configured to control a remote device via a first electronic device, wherein the first electronic device is configured to control the transmission of a semi-generic user voice command in an application, wherein the semi-generic voice command is updated based on one or more spoken words thereby generating an updated voice command; and wherein the remote control system comprises:
a second electronic device in communication with the first electronic device and disposed in the vehicle, the second electronic device comprising:
a user-input mechanism comprising at least one actuatable member, wherein the at least one actuatable member is configured to receive an input; and
a controller configured to prompt the first electronic device to cause the updated voice command to be accessed and transmitted to a remote device controller located remotely from the vehicle in response to the input from the user-input mechanism, wherein the remote device controller processes the updated voice command, generates a control command based on the updated voice command, and executes the control command for an action specified by the updated voice command.

2. The remote control system of claim 1, wherein the second electronic device is incorporated in a portion of a rearview mirror assembly or console of the vehicle.

3. The remote control system of claim 1, wherein the semi-generic voice command comprises a voice instruction to a voice-controlled electronic assistant.

4. The remote control system of claim 1, wherein the controller is further configured to cause the first electronic device to access the updated voice command from the application operating on the first electronic device and transmit the updated voice command to the remote device controller.

5. The remote control system of claim 1, wherein the updated voice command is pre-recorded and stored on a host server, wherein the electronic communication transmitted from the first electronic device includes an instruction prompting the host server to transmit the updated voice command to the remote device controller.

6. The remote control system of claim 1, wherein the updated voice command is assigned to the at least one actuatable member of the user-input mechanism and is transmitted to the remote device controller in response to the actuation of the at least one actuatable member.

7. The remote control system of claim 1, wherein the control command is for controlling one or more smart devices located remotely from the vehicle.

8. The remote control system of claim 7, wherein the one or more smart devices comprises a voice-controlled smart device connected to the remote device controller over an internet.

9. The remote control system of claim 1, wherein the control command is configured to request information from one or more smart devices located remotely from the vehicle.

10. The remote control system of claim 1, wherein the control command is configured to request a service from a web-based service provider.

11. The remote control system of claim 1, wherein in response to executing the control command, an auditory feedback is played over a speaker of the second electronic device or the controller of the second electronic device is configured to control a speaker of the vehicle to output the auditory feedback.

12. The remote control system of claim 1, wherein the second electronic device further comprises one or more visual indicators configured to indicate a visual notification that the control command is executed.

13. A remote control system in communication with a first electronic device, the remote control system comprising:
   a remote device controller remotely located from the first electronic device, wherein the remote device controller is configured to:
      receive an updated voice command via a communication initiated from the first electronic device, wherein the first electronic device is in communication with a second electronic device disposed in a vehicle, wherein the updated voice command comprises a semi-generic voice command updated based on one or more spoken words, and wherein the first electronic device is configured to:
         receive a prompt from a second electronic device, wherein the prompt is one of a plurality of programmable instructions communicated from a controller of the second electronic device in response to an input received by a user input mechanism of the second electronic device;
         in response to receiving the prompt from the first electronic device, cause the updated voice command to be accessed and transmitted to the remote device controller located remotely from the vehicle; and
      in response to receiving the updated voice command, the remote device controller processes the updated voice command, generates a control command based on the updated user voice command, and executes the control command for an action specified by the updated user voice command.

14. The remote control system according to claim 13, wherein user input mechanism is accessible in a passenger compartment of the vehicle.

15. The remote control system of claim 13, wherein the second electronic device is incorporated in a portion of a rearview mirror assembly or console of the vehicle.

16. The remote control system of claim 13, wherein the semi-generic voice command comprises a voice instruction to a voice-activated electronic assistant.

17. The remote control system of claim 13, wherein the controller is further configured to control the first electronic device to access the updated voice command from the application operating on the first electronic device and transmit the updated voice command to the remote device controller.

18. The remote control system of claim 13, wherein the updated voice command is pre-recorded and stored on a host server, wherein the electronic communication transmitted from the first electronic device includes an instruction prompting the host server to transmit the updated voice command to the remote device controller.

19. A method for operating a remote control system for a vehicle, the method comprising:
   recording one or more spoken words thereby generating a pre-recorded user voice command, wherein the one or more spoken words of the pre-recorded user voice command identify a device controlled by the remote control system;
   generating an update voice command by combining the pre-recorded voice command with a semi-generic voice command, wherein the semi-generic voice command is updated based on the one or more spoken words thereby generating an updated voice command configured to control the device;
   controlling a mobile electronic device to initiate a communication of the updated voice command to a remote device controller of the remote control system, wherein the mobile electronic device is controlled to initiate the communication of the updated voice command in response to a prompt from a vehicle accessory disposed in the vehicle, wherein the prompt is one of a plurality of programmable instructions communicated from a controller of the vehicle accessory in response to an input received by a user input mechanism of the vehicle accessory; and
   in response to receiving updated voice command, generating with the remote device controller a device specific command configured to control an operation of the device based on the semi-generic voice command and the pre-recorded user voice command.

20. The method according to claim 19, wherein the updated voice command is pre-recorded and stored on a host server, and wherein the initiation of the communication of the updated voice command via the mobile electronic device controls the host sever to communicate the updated voice command to the remote device controller.

* * * * *